United States Patent

Sheetz

[15] 3,695,371
[45] Oct. 3, 1972

[54] APPARATUS FOR DELIVERING SINGULATED FRUIT, WEIGHING AND BAGGING IT

[72] Inventor: Charles E. Sheetz, Woodstock, Va.
[73] Assignee: FMC Corporation, San Jose, Calif.
[22] Filed: Aug. 2, 1971
[21] Appl. No.: 168,247

[52] U.S. Cl. ............177/59, 177/105, 177/120, 222/58, 222/77
[51] Int. Cl. .............................................G01g 13/16
[58] Field of Search..177/59, 71, 105, 114, 116–120, 177/162; 222/58, 77; 221/288

[56] References Cited

UNITED STATES PATENTS

| | | | |
|---|---|---|---|
| 2,659,562 | 11/1953 | Cloud et al. | 177/119 X |
| 2,732,164 | 1/1956 | Legraw et al. | 177/59 |
| 2,889,130 | 6/1959 | Crabb | 177/119 X |
| 3,155,183 | 11/1964 | Bradford | 177/162 |
| 3,578,094 | 5/1971 | Henry | 177/119 X |

*Primary Examiner*—Richard B. Wilkinson
*Assistant Examiner*—George H. Miller, Jr.
*Attorney*—F. W. Anderson et al.

[57] ABSTRACT

A hopper is arranged to receive a continuous supply of singulated fruit and is pivotally mounted at one end thereof so that it can be pivoted upwardly to discharge the contents thereof when a predetermined weight of fruit has been accumulated therein. The hopper is pivotally mounted upon a support structure which is, in turn, mounted upon one end of a scale beam. The other end of the scale beam mounts a device which, when actuated, serves to engage the underside of the hopper to pivot it upwardly. Pivotable gate members are provided adjacent the movable end of the hopper to catch and hold a fruit which may follow the last fruit making up said predetermined weight of fruit.

15 Claims, 15 Drawing Figures

FIG_5

FIG_11

FIG_12

FIG_9A

FIG_13

FIG_14

APPARATUS FOR DELIVERING SINGULATED FRUIT, WEIGHING AND BAGGING IT

BACKGROUND OF THE INVENTION

1. Field of the Invention

The present invention pertains to apparatus for weighing and delivering articles in batches to a container, and more particularly, it pertains to apparatus for receiving a continuous supply of fruit or the like, for holding such fruit until a predetermined weight thereof is accumulated, and for delivering the accumulated batch of fruit to an awaiting container.

2. Description of the Prior Art

In the fruit packing industry, fruit is typically packaged by weight rather than by count, and packaging equipment has been designed which will automatically fill bags or boxes with predetermined weights of fruit. Generally such equipment will operate upon the placing of an empty container upon a yieldable platform that is part of a scale mechanism, and the container will continuously receive a supply of fruit until the scale mechanism is actuated as the predetermined weight is reached. The actuation of the scale mechanism serves to stop the supply of fruit to the container, and allows the filled container to be discharged and to be replaced by an empty container. This general type of filling apparatus has been widely used and has been utilized both for the filling of cardboard boxes and for the filling of bags.

In some instances, however, it has been found that it is not practical to weigh the fruit as it is placed into the containers, and it has been found to be more desirable or to be necessary to first weigh the fruit in a batch and then deliver the pre-weighed batch of fruit to the container. The requirement of batch weighing before packing may occur, for example, where a special type of container packing equipment is utilized which would interfere with the operations of the scale if the scale were operated during the packing operation.

One conventional way of forming fruit from a continuously moving input into a batch and then delivering the batch to a container is through the use of an intermediate hopper which may be weighed as part of a scale mechanism. Fruit can be delivered continuously to the hopper until the weight of the hopper and fruit attains the desired value. At that time means are actuated to stop the fruit supply, the hopper will in some manner be activated so as to discharge the fruit therefrom into the awaiting container. Prior art patents which generally disclose such apparatus include, for example, the U.S. Pats. to Grant No. 2,614,787; Belk No. 3,072,207; and Bradford No. 3,155,183. The structures disclosed in these patents and similar structures have generally tended to be somewhat complex, and therefore uneconomical to manufacture, or they have encountered functional problems which have seriously reduced their efficiency and reliability. Consequently, none of such prior art devices have proven to be a wholly satisfactory answer to the packaging of fruit in pre-weighed batches.

SUMMARY OF THE INVENTION

With the apparatus of the present invention a tiltable hopper is provided which is adapted to receive a continuous supply of singulated articles, such as fruit, and to deliver such articles to a container. The hopper is adapted to receive articles singly until a sufficient number of articles are received in the hopper to attain the desired weight. The hopper is mounted as part of a scale mechanism, and control means are provided so that, upon the reception of the required weight of articles in the hopper, the supply thereto is stopped, and the hopper is tilted about one end thereof to discharge the articles therefrom.

Special features of the present invention include, particularly, the general construction of the hopper and the manner in which the hopper is tilted to discharge the contents thereof once the required weight is achieved. This tilting is accomplished by an actuatable dump member which acts to pivot the hopper about one end thereof. The dump member is normally out of contact with the hopper and is located adjacent the lower face thereof. It is moved into engagement with the hopper only when it pivots the hopper to discharge the contents thereof. Preferably, the dump member forms a portion of the counterbalance for the hopper on the scale mechanism in order to reduce the required structure and provide a more compact mechanism.

Another special feature of the present invention is the use of gate members and a support platform at the entrance to the hopper which act together to prevent additional articles from entering into the hopper once the desired weight is achieved. The support platform, while it is weighed with the hopper, is not movable with the hopper. Thus, the contents of the hopper can be discharged while a trailing article can be received upon the support platform. Normally, the article which closely follows the last article required to make the desired weight will be received on the support platform when the hopper is tilted, and this article will be held thereon by the gate members which are energized with the actuation of the hopper.

The batch weighing and delivering apparatus of the present invention has been found to be acceptable to the fruit packing industry in that it provides a gentle handling of fruit at relatively high operating speeds. Furthermore, the structure is not complex or bulky and can be manufactured economically, and its relatively small size makes it adaptable to practically all fruit packing house conditions.

DESCRIPTION OF THE PREFERRED EMBODIMENT

Figure 1:
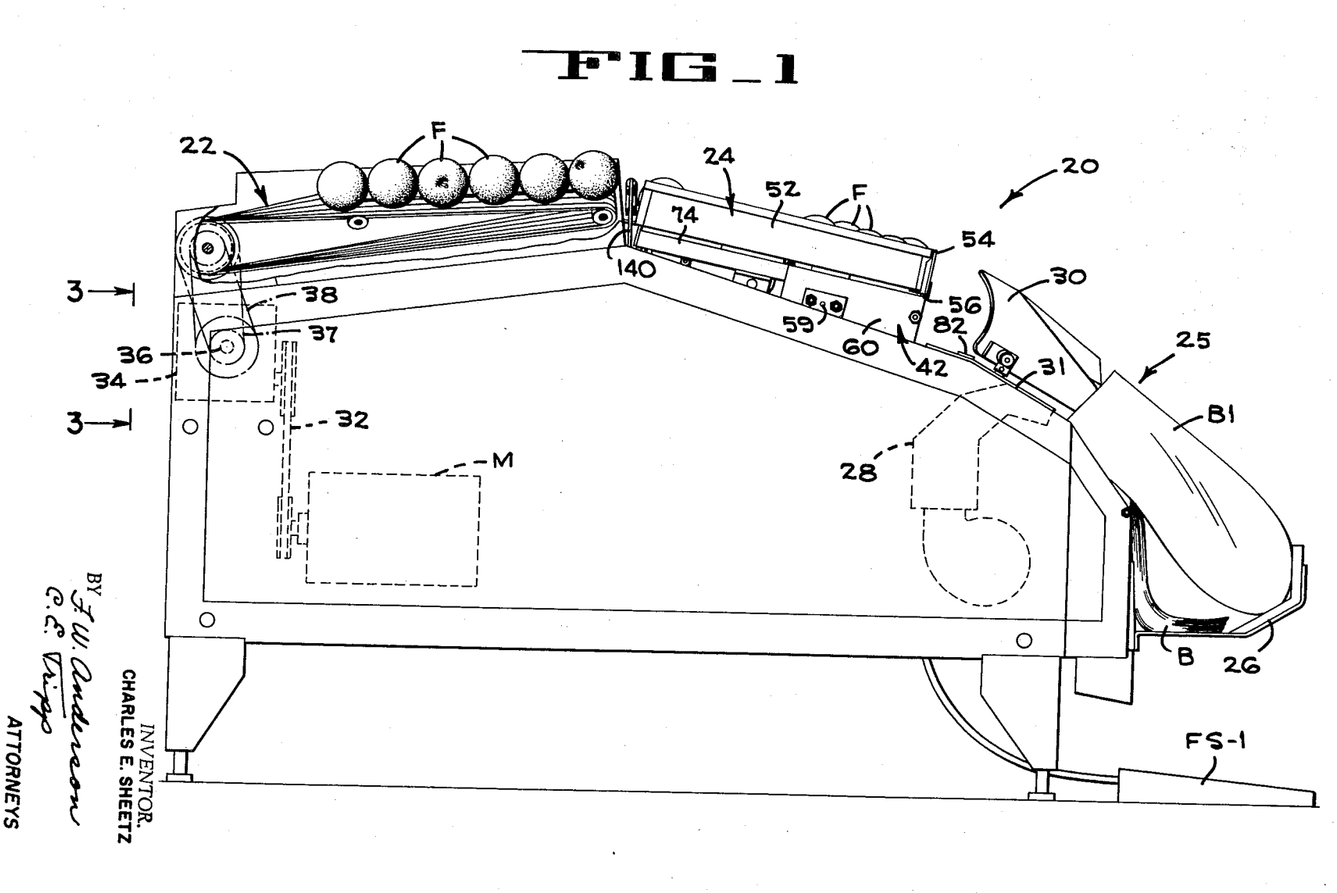
FIG. 1 is a diagrammatic side elevation of a fruit bagging machine incorporating the batch weighing and delivering apparatus of the present invention with a portion thereof being broken away for the purpose of clarity.
Figure 2:
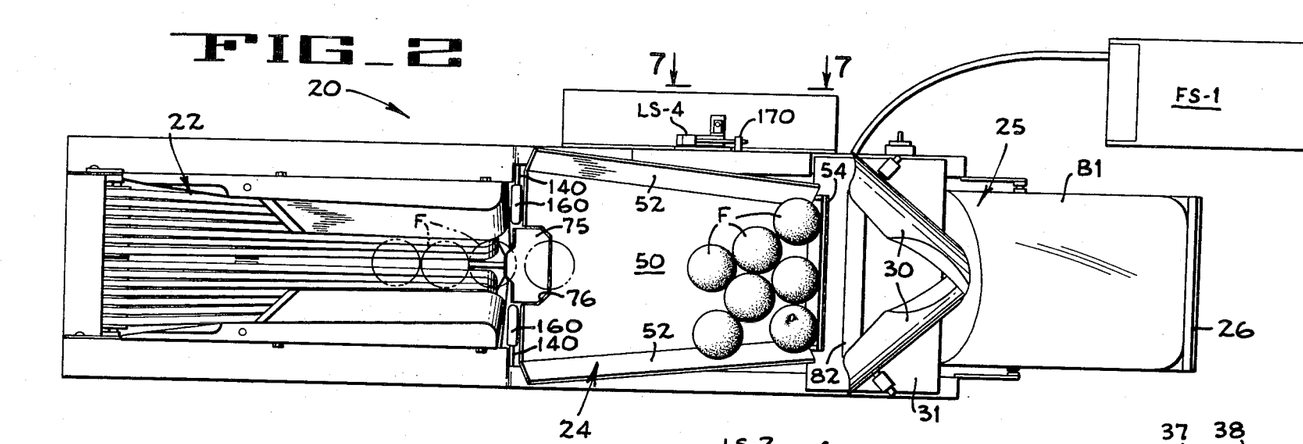
FIG. 2 is a diagrammatic plan of the bagging machine shown in FIG. 1.

Referring now more particularly to the drawings, FIGS. 1 and 2 illustrate diagrammatically a fruit bagging machine 20 which incorporates the batch weighing and delivery apparatus of the present invention. The bagging machine includes a trough-shaped conveyor 22 which is arranged to receive a bulk supply of fruit F, singulate them, and deliver them continuously to a pivotally mounted hopper 24 which forms an integral and important part of the batch weighing and delivery apparatus of the present invention. At the discharge end of the machine there is provided a bagging means 25 which includes a support platform 26 for supporting a stack of wicketed bags B the uppermost one B1 of which is shown in an open position ready to receive fruit therein. Means (not shown) are provided to grip the bag at its upper end, and a continuously operable blower 28 is provided to emit an air stream adjacent the mouth of the bag to maintain the bag in its open condition as shown in FIG. 1. Mounted directly above the openmouthed bag B1 are a pair of pivotally mounted guide members 30 which are arranged to direct the fruit from the hopper 24 down an inclined fruit ramp 31 and into the open bag when the contents of the hopper are discharged. The bagging means 25 and its manner of operation are generally conventional. Since the details of this structure are not pertinent to or necessary for an understanding of the present invention, they will not be further described herein. It will be recognized that such air-flow bagging devices may be obtained in the marketplace or they may be easily constructed in accordance with the foregoing description.

The fruit singulator and conveyor 22 is also a conventional fruit feeding apparatus, and the details of this structure are not pertinent to an understanding of the present invention. This conveyor is disclosed in detail in prior U. S. Pat. No. 2,813,617, issued to Charles E. Sheetz on Nov. 19, 1957, and reference to this patent may be had for the details of the structure of the conveyor.

Figure 3:
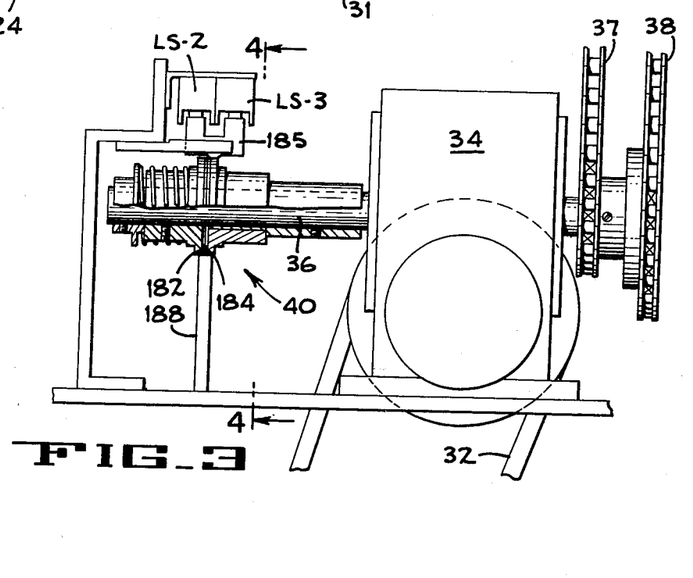
FIG. 3 is an enlarged front elevation taken in the direction of the line 3—3 of FIG. 1 and illustrating the overriding clutch mechanism for controlling the movement of the fruit feeding conveyor.

Although the structural details of the conveyor 22 are not pertinent to the present invention, it should be pointed out that the movement of the conveyor 22 must be controlled when the fruit weighing and delivering apparatus of the present invention is utilized in order to prevent fruit from spilling out onto the ground or from jamming or otherwise impeding the operation of the weighing and delivering apparatus. Accordingly, a motor M is provided to drive the conveyor through a conventional drive belt 32 and a gear reducer 34. Referring now to FIG. 3, it will be seen that the gear reducer 34 mounts a drive shaft 36 which is connected, by means of drive chains 37 and 38, to the V-belts that form the conveyor 22 in the manner pointed out in the aforementioned U. S. Pat. No. 2,183,617. Drive shaft 36, at the end thereof opposite from the mounting of the drive chains 37 and 38, mounts an overriding clutch mechanism 40 the purpose of which will be later described.

Figure 5:
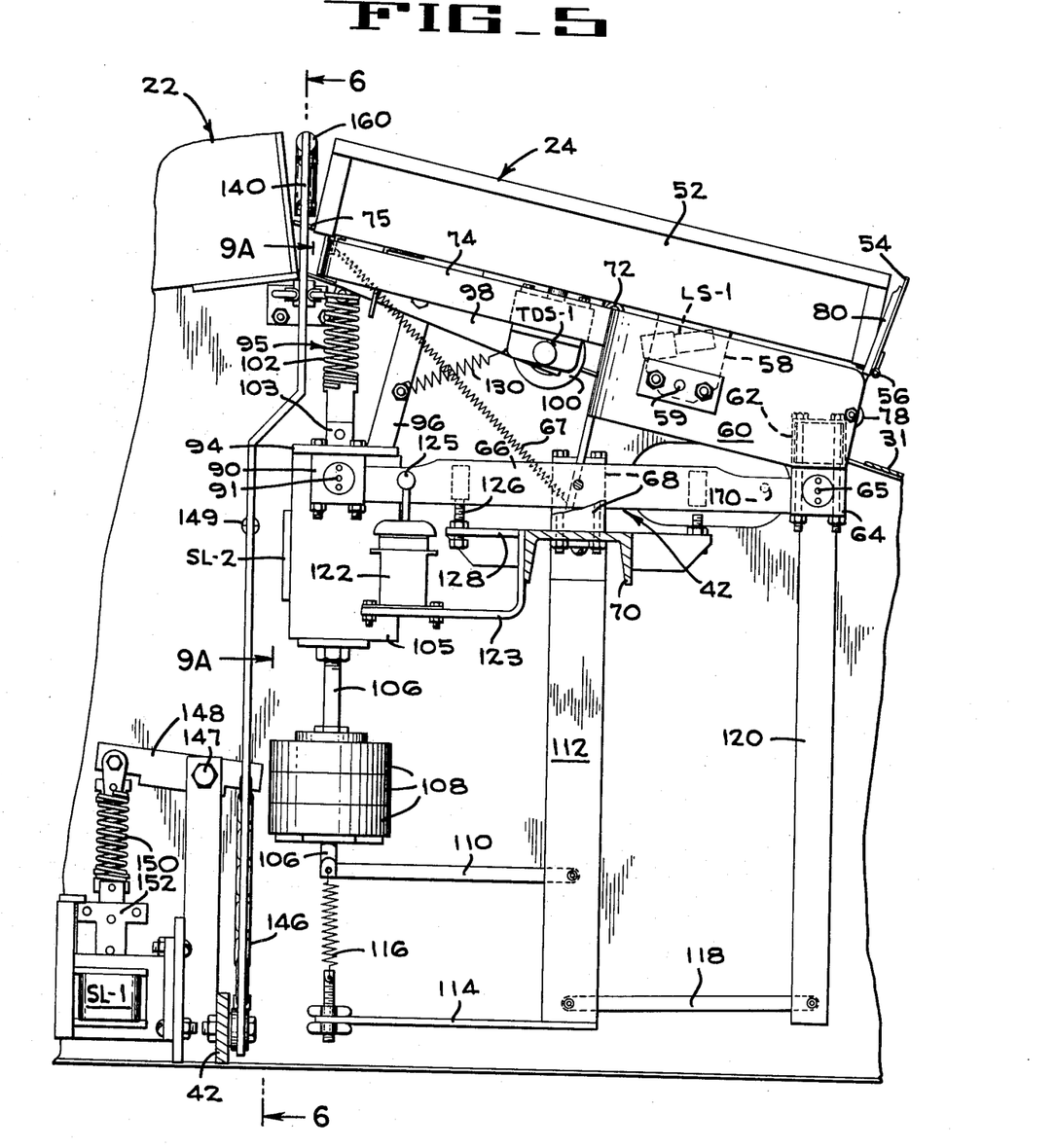
FIG. 5 is a side elevation of the batch weighing and delivering apparatus of the present invention.
Figure 14:
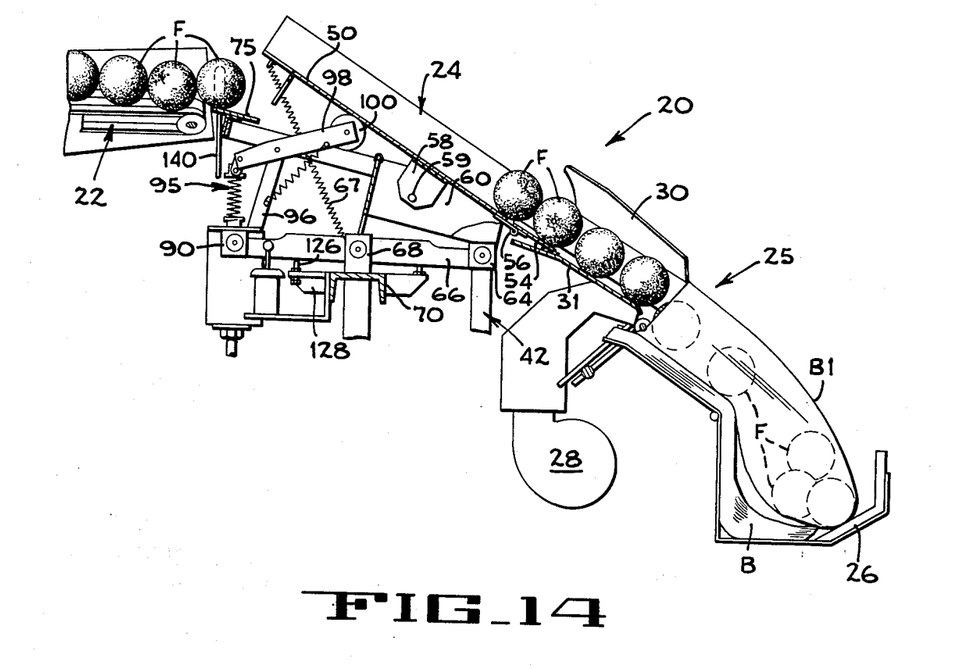
FIG. 14 is a longitudinal section, similar to FIG. 12, but illustrating the condition of the apparatus of the present invention as in FIG. 13.

The batch weighing and delivery apparatus of the present invention is shown in detail in FIG. 5. It will therein be seen that the hopper 24 is arranged so as to receive the singulated fruit F from the conveyor 22 into the elevated rearward end thereof. The hopper is pivotally mounted upon a scale mechanism 42 which senses the weight of the hopper and its contents and determines when the predetermined weight of fruit has been deposited therein. When this condition is attained, the hopper is arranged to be pivoted upwardly, as shown for example in FIG. 14, and the fruit is discharged therefrom onto the ramp 31 where it can gravitate to the open bag B1 at the end of the bagging machine structure.

The hopper 24 will be seen to generally comprise a tray-like structure including a floor panel 50, a pair of outwardly sloping side panels 52, and a front panel 54 which is pivotally mounted (FIG. 8) to the floor panel 50 at the forward end thereof by means of a hinge 56. The rearward end of the hopper (FIG. 2) is open so that the hopper will be able to readily receive fruit from the conveyor 22.

Figure 9:
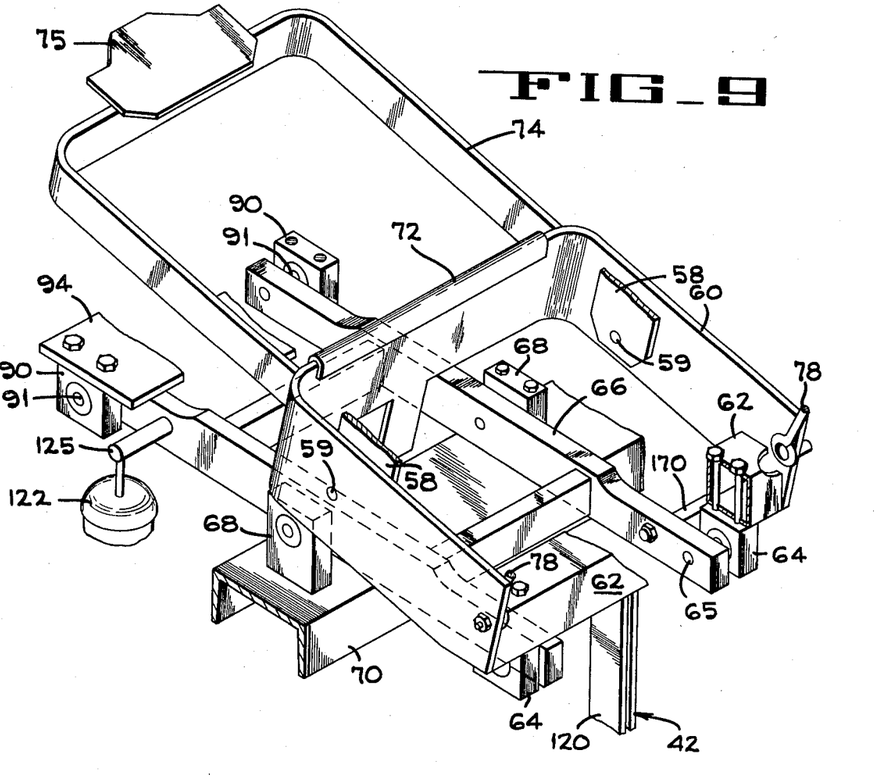
FIG. 9 is a diagrammatic isometric view of the hopper mounting structure and a portion of the scale mechanism of the apparatus shown in FIG. 5.

The hopper is mounted by means of a pair of depending brackets 58 which are fixed to the underside of the floor panel 50 and are pivotally mounted upon a generally U-shaped frame member 60 by means of pivot pins 59, as best seen in FIG. 9. It will be noted (FIG. 9) that the U-shaped frame member 60 is rigidly secured to a channel 62 at the forward end thereof so that it extends in cantilever fashion from said channel. Channel 62 is bolted to bearing blocks 64 which are, in turn, rotatably mounted upon one end of a generally H-shaped scale beam 66 by means of pivot pins 65. The scale beam is rotatably supported for balanced movement about its center portion by bearing blocks 68 which are mounted upon an inverted channel frame member 70 that forms a portion of the frame structure of the bagging machine 20. A mounting arm 60a extends downwardly from the central portion of the U-shaped frame member 60 to mount one end of a spring 67 the other end of which is attached to the rearward end of the hopper (FIG. 5). The spring 67 thereby serves to maintain the hopper in its lowered position during the filling thereof. A resilient pad 72 is provided atop the U-shaped frame member 60 to support the bottom of the hopper in its lowered fruit accumulating position. It will also be noted that a U-shaped bracket 74 is fastened to and extends rearwardly from the U-shaped frame member 60 and serves to mount a small support platform 75 at the outer end thereof. This support platform, as seen in FIG. 2 for example, is designed to be received within and in general alignment with a notch 76 at the rearward end of the floor panel 50 of the hopper when the hopper is in its lowered position. It will be noted that while the hopper is arranged to be pivoted about the axis of the pivot pins 59 in its support brackets 58, the support platform 75 will remain fixed in position. This support platform is provided to hold and support a fruit which may be discharged from the conveyor 22 after the predetermined weight of fruit is obtained in the hopper.

Figure 8:
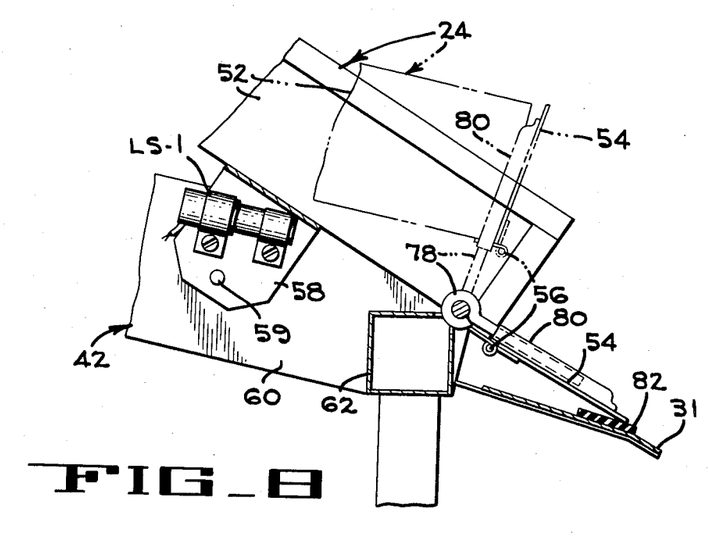
FIG. 8 is an enlarged detail view of the front portion of the hopper shown in FIG. 5 illustrating its elevated or actuated position in full lines with its normal unactuated position being indicated in phantom lines.

It will also be noted that a pair of elongated pivot pins 78 are rotatably fastened to the inner opposed faces of the U-shaped frame member 60 adjacent the forward end thereof. The free ends of the pivot pins 78 are slidably received within a pair of slide joints 80 (one only being shown in FIG. 8) attached to the trailing face of the front panel 54 of the hopper so that, when the hopper is pivoted upwardly (by means to be disclosed hereinafter), the front panel will be caused to pivot downwardly with respect to the rest of the hopper structure so as to allow the fruit to roll out of the hopper. In its lowermost position, as shown in FIG. 8, the top edge of the front panel 54 is adapted to be received upon a bumper strip 82 mounted on the discharge ramp 31 leading to the bagging apparatus at the front end of the machine, and it will be noted that the front panel thereby forms an extension of the discharge ramp from the hopper to the bag B1.

Figures 9A, 11, 12:
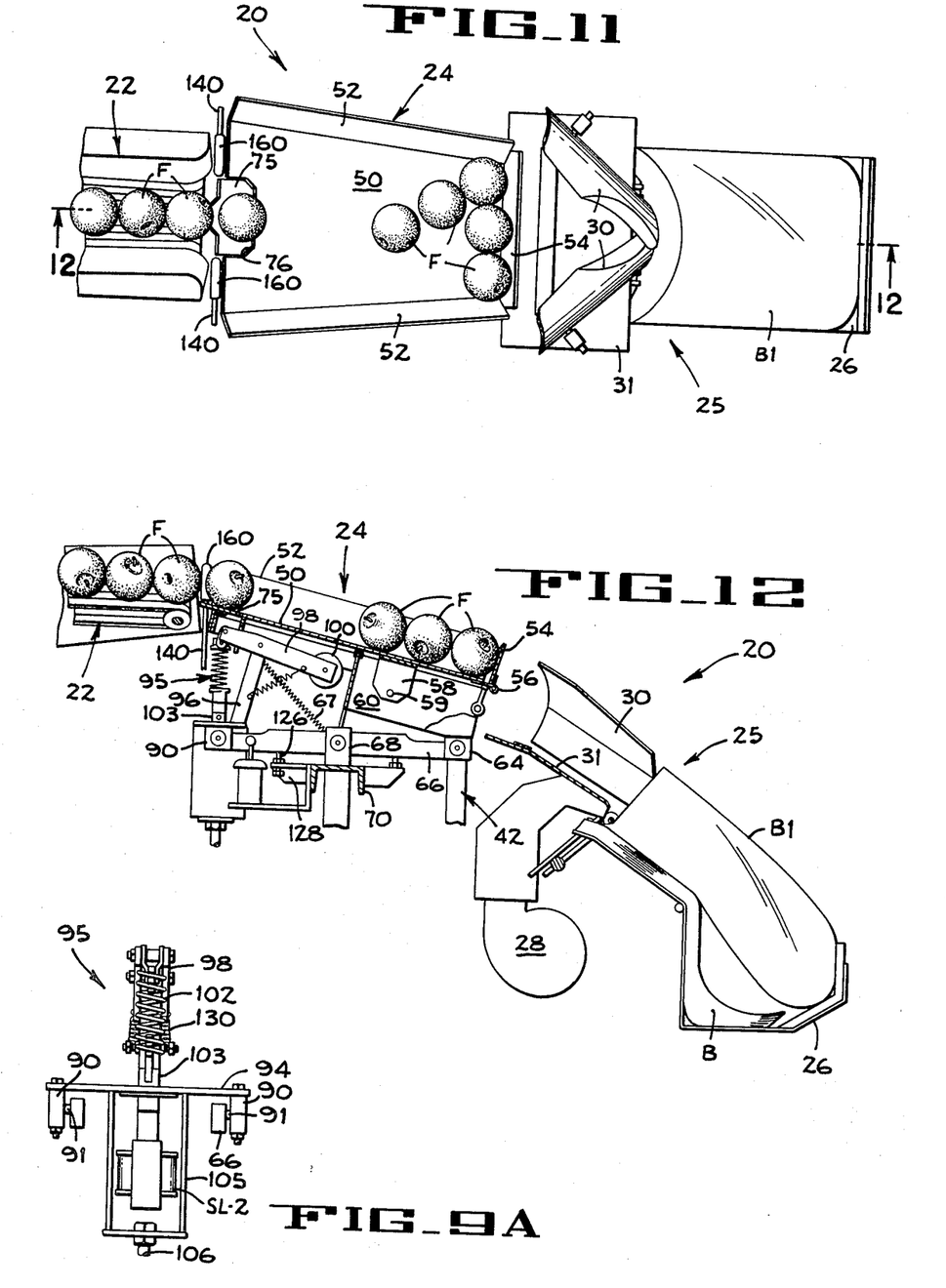
FIG. 9A is an end elevation of the hopper dump member taken in the direction of the line 9A—9A of FIG. 5.
FIG. 11 is a diagrammatic plan of the bagging machine of FIGS. 1 and 2 illustrating the apparatus of the present invention when fruit is flowing to the hopper.
FIG. 12 is a longitudinal section taken along the line 12—12 of FIG. 11.

The scale mechanism 42 is a balance-type scale mounted to pivot about the bearing blocks 68 attached to the central frame member 70. The counterbalancing end of the scale beam is rotatably mounted in bearing blocks 90 by means of pivot pins 91 (FIG. 9) which bearing blocks mount a support panel 94 that extends across the scale beam structure at the outer end thereof. Support panel 94 serves to mount the hopper dumping mechanism 95 (FIGS. 5 and 9A) which includes an upwardly extending post 96 to which a pivot arm 98 is rotatably attached at the upper end thereof. One end of the pivot arm 98 rotatably supports a roller 100 and the other end thereof is secured to a spring 102 that is connected to the plunger 103 of a solenoid SL-2. The support platform 94, as shown in FIG. 9A, is also adapted to support the solenoid structure SL-2 which is mounted within a box frame member 105 secured to the lower side of the support platform. Depending from the lower end of the box frame member 105 is a rod 106 which has removably secured thereto a plurality of weights 108 for counterbalancing the scale. The lowermost end of rod 106 is pivotally mounted to a cross link member 110 the other end of which is pivotally mounted to a frame member 112 that is rigidly secured to the underside of the fixed channel frame member 70. Frame member 112 carries at its lowermost end a bracket 114 to which the lowermost end of a spring 116 is adjustably connected. The upper end of spring 116 is connected to the pivotal connection between link 110 and the support rod 106, and the spring 116 thereby determines the resistance of the scale to movement as the hopper 24 is filled. Supporting frame member 112 is also connected by means of a pivot link 118 with a depending bracket 120 which is rigidly attached to the supporting channel 62 at the forward end of the scale beam (FIG. 9). It will thereby be seen that a parallelogram scale beam arrangement is provided whereby the hopper at its supporting structure is mounted on one end of the scale beam while the counterweights 108 and the hopper dumping mechanism 95 are mounted on the other end of the scale beam. In order to restrain the movement of the scale beam so that it will not oscillate under the impact of the fruit discharged to the hopper, a dash pot 122 is mounted upon a bracket 123 that is secured to the frame member 70. An arm 125 is mounted so as to extend from one side of the scale beam 66 in communication with the dash pot. In the normal condition of the scale beam during the initiation of the filling of the hopper, the hopper will rest upon an adjustable stop 126 mounted upon a bracket 128 that is secured to the frame member 70 (FIG. 5).

The hopper dumping mechanism 95 for pivoting the hopper includes the solenoid-actuated pivot arm 98 as heretofore pointed out. This structure, which is normally out of engagement with the hopper as shown in FIG. 12 for example, is arranged to be pivoted about its pivotal connection with the support post 96 so that the roller 100 will move upwardly when the solenoid SL-2 is actuated to retract the plunger 103. This action will force the roller against the floor plate 50 of the hopper to cause the hopper to be pivoted upwardly to discharge the fruit therefrom, as shown for example in FIG. 14. A return spring 130 is connected between the pivot arm 98 and the post 96 so that the pivot arm will be returned to its normal position when the solenoid SL-2 is deenergized, and the hopper will be returned to its lowered position by means of the spring 67 connected to the underside thereof.

Figure 6:
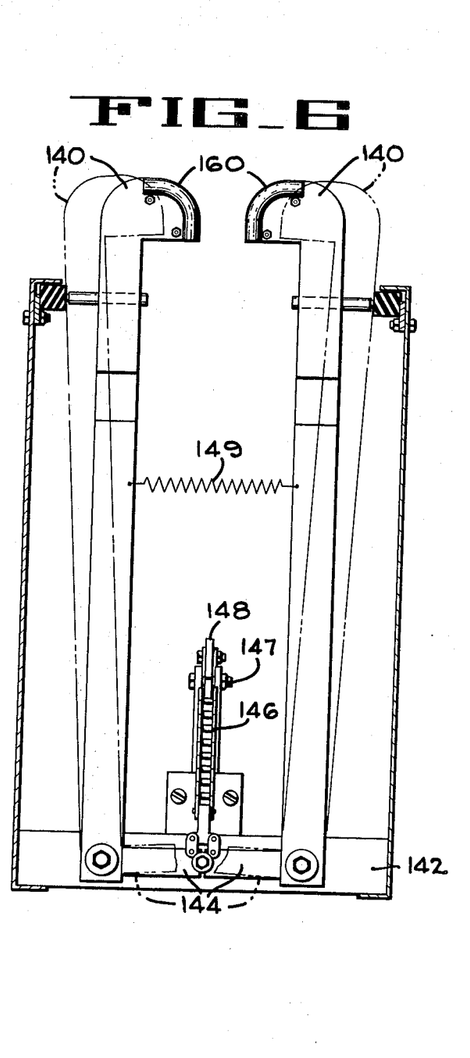
FIG. 6 is a reduced section taken along the line 6—6 of FIG. 5 and particularly illustrating the fruit gate members and their method of operation.

A special feature of the present invention is provided by a pair of fruit gate members 140 which are shown in detail in FIG. 6. These fruit gate members comprise narrow upright slats of rigid material which are pivotally mounted at the lower ends thereof upon a cross frame member 142 of the machine. Securely attached to the gate members adjacent the lower ends thereof are a pair of pivot arms 144. The pivot arms are each rotatably mounted to the lower end of a chain 146 which is attached at its upper end to a crank arm 148. The crank arm 148 is pivotally mounted by means of a pin 147 to the frame of the machine, and the free end of the crank arm is connected by means of a spring 150 to the plunger 152 of a solenoid SL-1. During the operation of the apparatus of the present invention when the hopper is filling with fruit, the solenoid SL-1 is arranged to be actuated so that the crank arm 148 will be pivoted to elevate the chain 146 and cause the fruit gate members 140 to be pivoted outwardly. When the hopper is tilted to discharge fruit therefrom the solenoid SL-1 is arranged to be deenergized and a tension spring 149 connected between the gate members 140 causes the gate members to pivot inwardly (as shown in full lines in FIG. 6) to catch and hold a fruit should one be passing across the support platform 75 and into the hopper. The gate members are provided with cushioned pads 160 at their upper and inner edges thereof in order to prevent damage to any fruit which they might engage.

Figure 7:
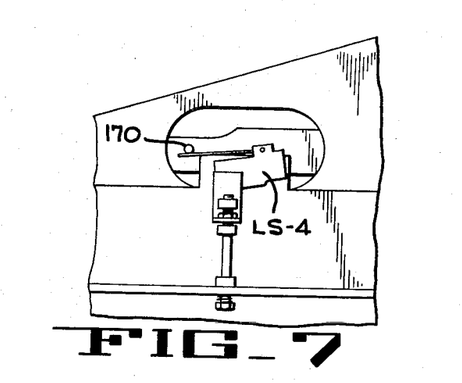
FIG. 7 is an enlarged side elevation taken in the direction of the line 7—7 of FIG. 2 and particularly illustrating the scale switch.

As shown in FIG. 7, the scale beam 66 is provided with a pin 170 which extends laterally from the side face thereof so as to engage the actuating arm of a limit switch LS-4 when the weight on the front end of the scale beam is such as to sufficiently overcome the resistance of the scale spring 116 and to cause the front end of the beam to be depressed by a predetermined amount. The condition which is attained when the last fruit required to make the predetermined batch passes across the support platform 75 can thereby be sensed, and electrical control means (to be presently explained) can be utilized to put into operation the hopper dumping mechanism 95. It is also pointed out that the hopper (FIG. 8) carries a mercury switch LS-1 on one of the depending support brackets 58 thereof for a purpose to be described presently.

Figure 4:
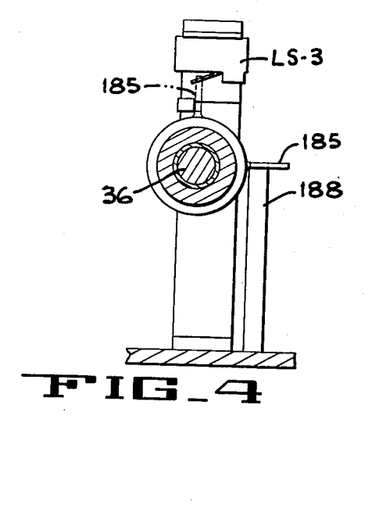
FIG. 4 is a section taken along the line 4—4 of FIG. 3.

When the apparatus is operated, the conveyor 22 is arranged to be continuously driven. When the hopper is filled and the scale switch LS-4 is actuated, it has been found to be desirable, in order to prevent excess fruit from being conveyed to the hopper, to quickly bring the conveyor 22 to a stop and to reverse the drive to the conveyor to cause the conveyor to travel rearwardly a limited distance (in practice about 6 or 7 inches) before coming to a complete stop. This operation is accomplished by the aforementioned overriding clutch mechanism 40 which is particularly shown in FIGS. 3 and 4 of the drawings. This clutch mechanism comprises a friction disc 182 which is mounted upon the drive shaft 36 for yieldable axial movement and is urged against the face of a clutch plate 184 which is rotatably mounted upon the shaft. The clutch plate includes a projecting arm 185 (FIG. 4) which is arranged in its uppermost position (as shown in phantom lines in FIG. 4) to engage a pair of limit switches LS-2 and LS-3. In the rotated position of the clutch plate, the projecting arm 185 is arranged to engage a stop 188 to allow the clutch plate to slip on the face of the friction disk while the drive shaft 36 continues to turn. During forward movement of the conveyor, the clutch plate will rotate until the arm 185 engages the stop 88 and will thereafter slip on the friction disk during continued forward drive to the conveyor. When the conveyor is reversed, the clutch plate will rotate approximately 90° to allow a limited amount of reverse conveyor travel until the switches LS-2 and LS-3 are engaged to stop the motor M completely.

Figure 10:
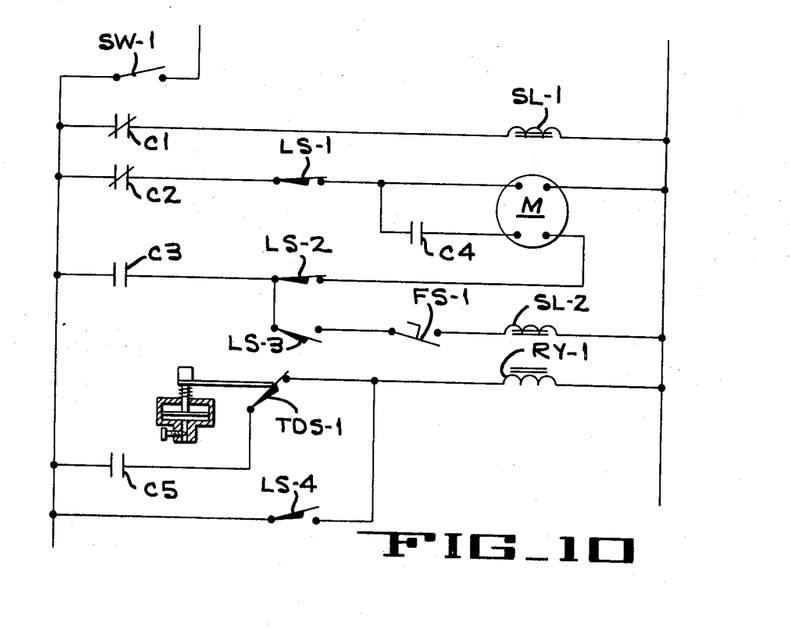
FIG. 10 is a schematic diagram of the electrical circuitry for the apparatus of the present invention.
Figure 13:
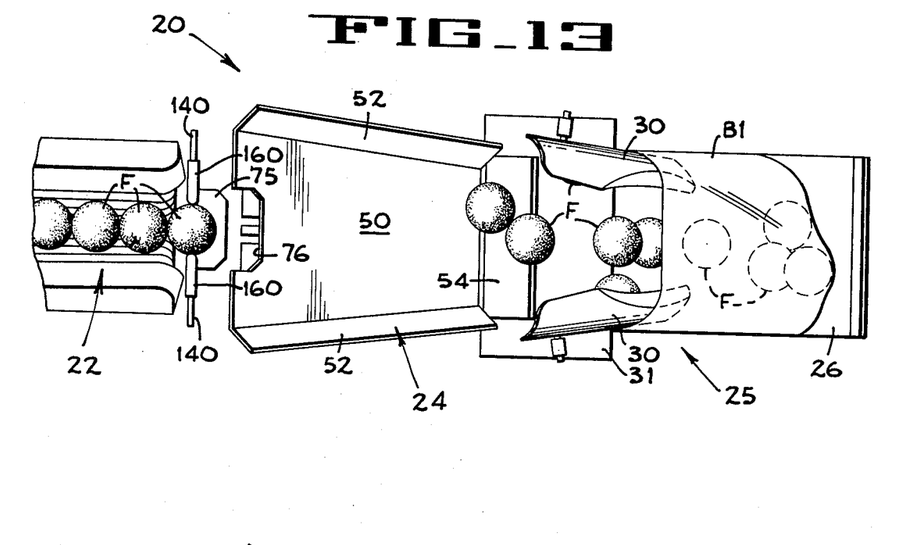
FIG. 13 is a diagrammatic plan of the bagging machine, similar to FIG. 11, but illustrating the condition of the apparatus when fruit is being delivered from the hopper to the awaiting container.

The operation of the apparatus of the present invention will now be described particularly with reference to the electrical schematic diagram of FIG. 10. It will be noted that a toggle switch SW-1 is provided for switching power to the circuitry. This will cause the fruit gate solenoid SL-1 to be energized through the normally closed contact C1 and will start the motor M through the normally closed contact C2 and the hopper switch LS-1, which latter switch will be in its normally closed condition when the hopper is in its lowered position. The conveyor will then be driven forwardly, and fruit will be fed in single file into the hopper 24 until the desired weight of fruit is accumulated in the hopper. At this time, the scale switch LS-4 will be actuated so as to energize a control relay RY-1. This control relay will open the normally closed contact C1 and deenergize the gate solenoid SL-1 to cause the gate members 140 to spring inwardly and catch a fruit which may be following the last fruit that was weighed prior to actuation of the scale switch. The fruit which is caught by these gate members will rest on the support platform 75 so that when the weighing cycle is again started this fruit will be discharged into the hopper.

The energizing of control relay RY-1 also opens the normally closed contact C2 to remove the forward driving power to the motor M which is a conventional reversible single-phase capacitor-start induction motor. The energization of relay RY-1 closes the normally open contact C3 to supply power through the normally closed clutch limit switch LS-2 to the reverse terminal of the motor. A normally open contact C4 is also closed by the control relay RY-1 so that the centrifugal switch in the reversible motor will be by-passed to prevent the motor from turning off when it reaches the null point. Thus, the conveyor 22 will be rapidly stopped and immediately started in the reverse direction upon energization of the control relay. Once the conveyor starts in the reverse direction, the clutch plate 184 will be moved by the friction disk 182 of the overriding clutch mechanism and will rotate approximately 90° to the uppermost position, as shown in phantom lines in FIG. 4, to activate the clutch limit switches LS-2 and LS-3. When switch LS-2 is actuated the power to the motor is removed and the conveyor 22 is brought to a stop.

The closing of clutch limit switch LS-3 provides power to the hopper dumping mechanism 95 and its control solenoid SL-2 through a foot switch FS-1. This foot switch, which is provided alongside the bagging machine at the forward end thereof as shown in FIGS. 1 and 2, is adapted to be operated manually by the operator of the machine. During normal operation the operator will keep his foot on the switch FS-1 so that the hopper 24 will dump the weighed batch of fruit into the awaiting bag B1. However, should a problem occur, e.g., where a bag or other container is not available to accept the fruit from the hopper, the operator can remove his foot from the switch FS-1 and the hopper will then not be dumped since the solenoid SL-2 cannot be energized. Since the control relay will remain energized, no driving power to the conveyor 22 can occur until the foot switch FS-1 is closed, and thus the apparatus will remain in a stopped condition until such time as the operator is ready to allow the operating cycle to continue.

It will be noted that although the scale switch LS-4 is actuated to energize the control relay, this scale switch will open as soon as the hopper is elevated. However, the control relay is maintained in its energized condition by a normally open holding contact C5 which is closed when the relay is energized. The circuit through the holding contact C5 also includes a time delay switch TDS-1 which will maintain the control relay RY-1 energized only for a predetermined amount of time which time will be that necessary to allow the fruit to be completely discharged from the tilted hopper. During this time period the hopper switch LS-1 will be opened so that forward power cannot be provided to the conveyor until the hopper returns to its lowered position. Once this predetermined time has elapsed, the time delay switch TDS-1 will open to deenergize the control relay RY-1, and the apparatus will again be reset for a subsequent hopper filling cycle. The apparatus will not start, however, until the hopper switch LS-1 is closed by the return of the hopper to its lowermost position.

With the apparatus of the present invention it will be seen that a batch weighing and delivering apparatus is provided which is readily adaptable to accept singulated articles, such as fruit, and to accumulate the same into batches which are delivered to an awaiting container without damage to the articles. The apparatus has proven to be successful for the automatic bagging of apples. It will be recognized that the structure is relatively simple and compact and can thereby be used in a wide variety of packing house conditions including certain situations wherein the prior art apparatus, which is generally more complex and of greater bulk, could not be used. The relative simplicity of the apparatus also provides for lower manufacturing costs and for less maintenance and fewer repairs. Furthermore, the operating speeds and reliability of the apparatus are generally at least equivalent to those of the prior art devices.

Although the best mode contemplated for carrying out the present invention has been herein shown and described, it will be apparent that modification and variation may be made without departing from what is regarded to be the subject matter of the invention.

What is claimed is:

1. An apparatus for batch weighing and delivering articles comprising a hopper arranged to receive at one end thereof a continuous singulated supply of said articles, means for mounting said hopper for pivotal movement about the end thereof opposite to said one end, scale means for supporting said hopper and for determining the weight of the articles accumulated therein, means for pivoting said hopper upwardly about its pivotal mounting means, and control means operable upon the reception of a predetermined weight of articles in said hopper for actuating said hopper pivoting means to cause the articles in said hopper to be discharged past the pivotally mounted end thereof.

2. An apparatus for batch weighing and delivering articles according to claim 1 including a pair of inwardly movable gate members mounted adjacent to said one end of said hopper, said control means being operable to actuate said gate members to cause them to move inwardly toward each other to catch and hold therebetween an article which follows the last article making said predetermined weight of articles in said hopper.

3. An apparatus for batch weighing and delivering articles according to claim 2 including a support platform carried by said means for mounting said hopper and located at said one end of said hopper when said hopper is in its lowered article receiving position, said platform being arranged to support from below said article held by said gate members when said hopper is pivoted upwardly therefrom.

4. An apparatus for batch weighing and delivering articles according to claim 1 wherein said means for pivoting said hopper is normally out of contact with said hopper and is arranged to be moved into contact with the lower surface of said hopper when it is actuated.

5. An apparatus for batch weighing and delivering articles according to claim 4 wherein said scale means comprises a balance beam, said hopper and said means for mounting said hopper being mounted upon one end of said beam, and said hopper pivoting means being mounted upon the other end of said beam as a counterbalance for said hopper.

6. An apparatus for batch weighing and delivering articles according to claim 4 wherein said hopper pivoting means comprises an arm pivotally mounted at its central portion, a roller mounted at one end of said arm, and a solenoid operatively connected to the other end of the arm for swinging said roller into engagement with said lower surface of the hopper.

7. An apparatus for batch weighing and delivering articles according to claim 4 wherein said hopper includes a pivotally mounted front flap at said pivotally mounted end of the hopper, and means operable upon upward pivotal movement of said hopper for pivoting said front flap downwardly to permit the articles accumulated in said hopper to gravitate therefrom.

8. An apparatus for batch weighing and delivering articles comprising conveying means for continuously feeding articles in single file, a hopper positioned adjacent to said conveying means to receive said articles therefrom across one open end thereof, means for mounting said hopper for pivotal movement about the end thereof opposite to said one end, scale means for supporting said hopper and for determining the weight of the articles accumulated therein, means for pivoting said hopper upwardly about its pivotal mounting means, and control means operable upon the reception of a predetermined weight of articles in said hopper for actuating said hopper pivoting means to cause the articles in said hopper to be discharged past the pivotally mounted end thereof.

9. An apparatus for batch weighing and delivering articles according to claim 8 wherein said control means includes means for stopping and reversing said conveying means upon the reception of said predetermined weight of articles in said hopper.

10. An apparatus for batch weighing and delivering articles according to claim 8 including a pair of gate members mounted between said conveying means and said one end of said hopper, means mounting said gate members for shiftable movement in a direction transverse to the direction of movement of the articles discharged from said conveying means, said control means being operable to actuate said gate members to cause them to move inwardly toward each other to catch and hold therebetween an article which follows the last article making said predetermined weight of articles in said hopper.

11. An apparatus for batch weighing and delivering articles according to claim 10 including a support platform carried by said means for mounting said hopper and located at said one end of said hopper when said hopper is in its lowered article receiving position, said platform being arranged to support from below said article held by said gate members when said hopper is pivoted upwardly therefrom.

12. An apparatus for batch weighing and delivering articles according to claim 10 wherein said gate members are mounted for conjoint pivotal movement inwardly.

13. An apparatus for batch weighing and delivering articles according to claim 8 wherein said means for pivoting said hopper includes a pivot arm, a roller attached to said pivot arm, and means for swinging said pivot arm to cause said roller to engage the underside of said hopper to cause the hopper to be pivoted upwardly.

14. An apparatus for batch weighing and delivering articles according to claim 13 wherein said scale means comprises a balance beam, said hopper and said means for mounting said hopper being mounted upon one end of said beam, and said means for pivoting said hopper being mounted upon the other end of said beam as a counterbalance for said hopper.

15. An apparatus for batch weighing and delivering articles according to claim 14 wherein said pivot arm is mounted for pivotal movement about its central portion to permit said roller to roll along the underside of said hopper as said hopper is elevated, and means for pivoting said pivot arm by moving one end thereof downwardly.

* * * * *